United States Patent [19]

Matsumoto et al.

[11] Patent Number: 5,072,306

[45] Date of Patent: Dec. 10, 1991

[54] SHEET FEEDING DEVICE FOR FACSMILE APPARATUS

[75] Inventors: Masafumi Matsumoto, Takaichi; Hiroshi Morimoto, Sakurai, both of Japan

[73] Assignee: Sharp Kabushiki Kaisha, Japan

[21] Appl. No.: 501,936

[22] Filed: Mar. 30, 1990

[30] Foreign Application Priority Data

Apr. 3, 1989 [JP] Japan .................................. 1-85337
Apr. 3, 1989 [JP] Japan .................................. 1-85338
Apr. 3, 1989 [JP] Japan .................................. 1-85339

[51] Int. Cl.$^5$ ........................ H04N 1/21; H04N 1/23; G03G 21/00
[52] U.S. Cl. ................................... 358/304; 355/311; 358/449
[58] Field of Search ........................ 355/310, 311, 320; 358/304, 449, 498, 296, 300

[56] References Cited

U.S. PATENT DOCUMENTS

| | | | |
|---|---|---|---|
| 3,451,320 | 6/1969 | Sage .................... | 355/310 X |
| 3,922,082 | 11/1975 | Cavallaro et al. ................... | 355/310 |
| 3,960,446 | 6/1976 | Ogawa et al. ........................ | 355/310 |
| 4,184,671 | 1/1980 | Sasamori ........................ | 355/320 X |
| 4,439,790 | 3/1984 | Yoshida ................................ | 358/449 |
| 4,474,453 | 10/1984 | Yanagawa et al. ............. | 355/311 X |
| 4,505,574 | 3/1985 | Kurata et al. ........................ | 355/311 |
| 4,699,034 | 10/1987 | Sue ................................ | 355/310 X |
| 4,956,723 | 9/1990 | Toda ................................ | 358/449 |

FOREIGN PATENT DOCUMENTS 0081362 6/1983 European Pat. Off. .
3606661 9/1986 Fed. Rep. of Germany .

OTHER PUBLICATIONS

Patent Abstracts of Japan vol. 7, No. 190 (E-194)(1335), Aug. 19, 1983; & JP-A-5892168 (Canon) 01.06.1983.
Patent Abstracts of Japan vol. 8, No. 53 (E-231)(1490), Mar. 9, 1984; & JP A-58205367 (Ricoh) 30.11.83.
Patent Abstracts of Japan vol. 6, No. 52 (E-100)(930), Apr. 7, 1982; & JP-A 56164674 (Canon) 17.12.1981.
Patent Abstracts of Japan vol. 11, No. 194 (P-588)(2641), Jun. 23, 1987; & JP-A-6217763 (Sanyo Electric) 26.01.1987.
Patent Abstracts of Japan vol. 13, No. 66 (P-828)(3414), Feb. 15, 1989; & JP-A-63253375 (Minolta Camera) 20.10.1988.

*Primary Examiner*—Fred L. Braun
*Attorney, Agent, or Firm*—Nixon & Vanderhye

[57] ABSTRACT

A compact and efficient facsimile machine sheet feeding device can automatically select either roll or cut sheet paper supplies in response to received signals indicating the size of the remotely located original document being electronically transmitted thereto. The roll paper supply is preferably located in one end of a cut paper supply tray. A dual purpose document receiving bin is also preferably utilized so as to selectively receive scanned original documents at one end and to receive incoming copy documents at the other end. Either a roll sheet or cut sheet paper supply can be selected in accordance with the width of the original document. If the roll sheet supply is selected, it is cut to have the desired length of the original document.

6 Claims, 5 Drawing Sheets

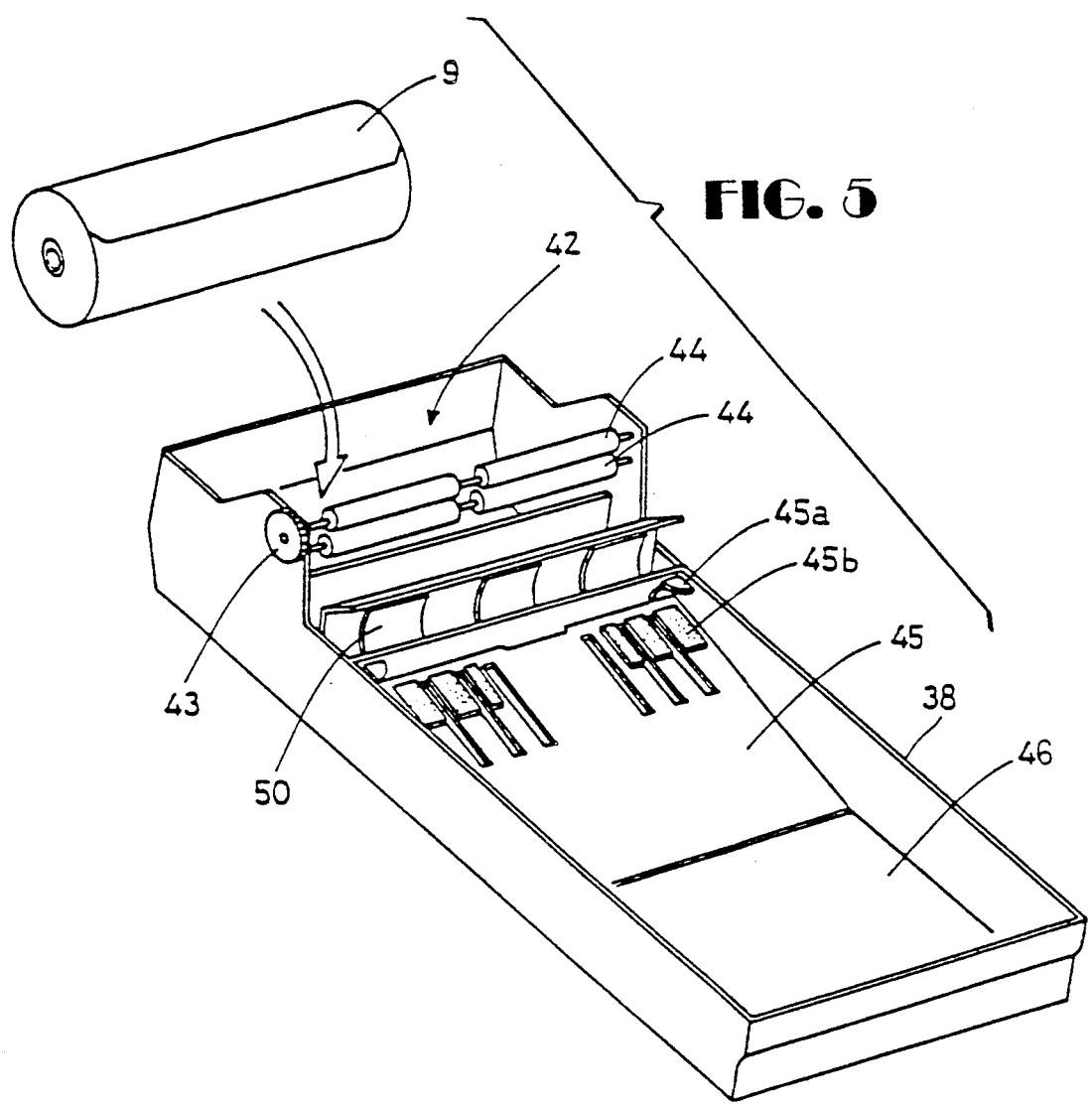

1

SHEET FEEDING DEVICE FOR FACSMILE APPARATUS

BACKGROUND OF THE INVENTION

1. Field of the Invention

The present invention relates to a sheet feeding device for use in facsimile apparatus, and more particularly to a sheet feeding device capable of automatically selecting a sheet size in accordance with a received message, wherein the sheet feeding device includes a sheet supplier and a sheet discharging means.

2. Description of the Prior Art

To clearly explain the background of the invention, reference will be made to FIG. 2 in which facsimile apparatus in common use is shown:

Facsimile apparatus are provided with one or two cassettes in which recording sheets are stacked. The illustrated example is a two-stage type which has one cassette above another. Received messages are recorded on the sheet fed from the cassette, and the sheets bearing the message are discharged by means of a discharging means. The apparatus requires another discharging means which discharges an original from which a message is transmitted.

In FIG. 2 a facsimile apparatus is provided with cassettes 2, 3 and discharging trays 2a, 3a. The double-cassette apparatus can handle sheets of five or six sizes, such as A4, B4, B5, letter size, legal size, which are stacked in the two cassettes. For use, a required size is automatically selected from the two cassettes. In FIG. 2 the facsimile apparatus includes a transmitter 4, a receiver 5 and a developing section 6 in which the received message is developed.

The known facsimile apparatus has the following disadvantages:

When a long message is received, the single-cassette type of facsimile must record it on two pages. As a result, the received message is divided into two pages. This consumes sheets and the reader must turn pages. This is troublesome. If the cassette contains sheets of no corresponding size to a received message size such as A4 v. B4 size, the received message (B4 size) will be automatically contracted to the A4 size.

With the double-cassette the same difficulty as pointed out above arises. Additional disadvantage is that the size of the facsimile apparatus as a whole is increased because of the provision of double cassettes. Likewise, the provision of double discharging trays enlarges the size of the apparatus, which reflects in the production cost, and requires a larger installation site.

SUMMARY OF THE INVENTION

The sheet feeding device for use in facsimile apparatus of the present invention, which overcomes the above-discussed and numerous other disadvantages and deficiencies of the prior art, comprises a housing for accommodating different sizes of sheets, and a control means for selecting an appropriate sheet size to the size of a received message.

In a preferred embodiment, the roll sheet is housed in a pocket and the cut sheets are placed in a recess, the pocket and the recess being formed in a tray in such a manner as to be adjacent to each other in the feeding direction of sheet.

In a preferred embodiment, the sheet feeding device includes a sheet discharging means on an extension of the feeding path of a transmitting original, and a change-over means for selecting a first position for receiving the transmitting original or a second position for allowing the transmitting original to pass.

Thus, the invention described herein makes possible the objectives of (1) providing a sheet feeding device adapted for use in facsimile apparatus, the device being compact in size and requiring no large installation space, (2) providing a sheet feeding device capable of selecting sheet sizes between roll sheet and cut sheets in response to a received message size, and (3) providing a sheet feeding device enabling one of the roll sheet or the cut sheets to automatically replace with the other which runs out of stock.

BRIEF DESCRIPTION OF THE DRAWINGS

This invention may be better understood and its numerous objects and advantages will become apparent to those skilled in the art by reference to the accompanying drawings as follows:

FIG. 5 is a perspective view on an enlarged scale showing a sheet feeding cassette.

DESCRIPTION OF THE PREFERRED EMBODIMENTS

Figure 1:
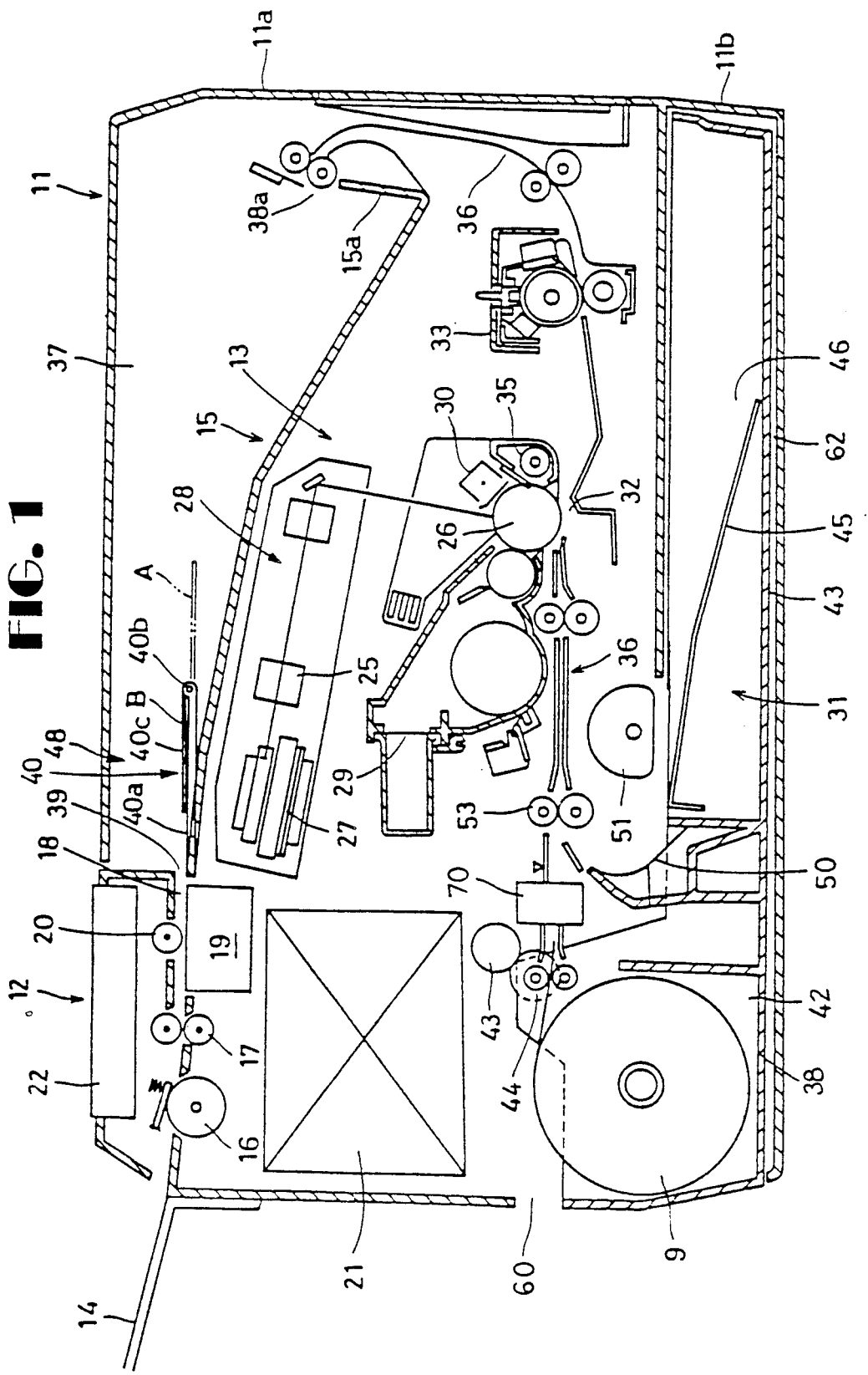
FIG. 1 is a vertical cross-sectional view through a facsimile apparatus including a sheet feeding device according to the present invention.
Figure 2:
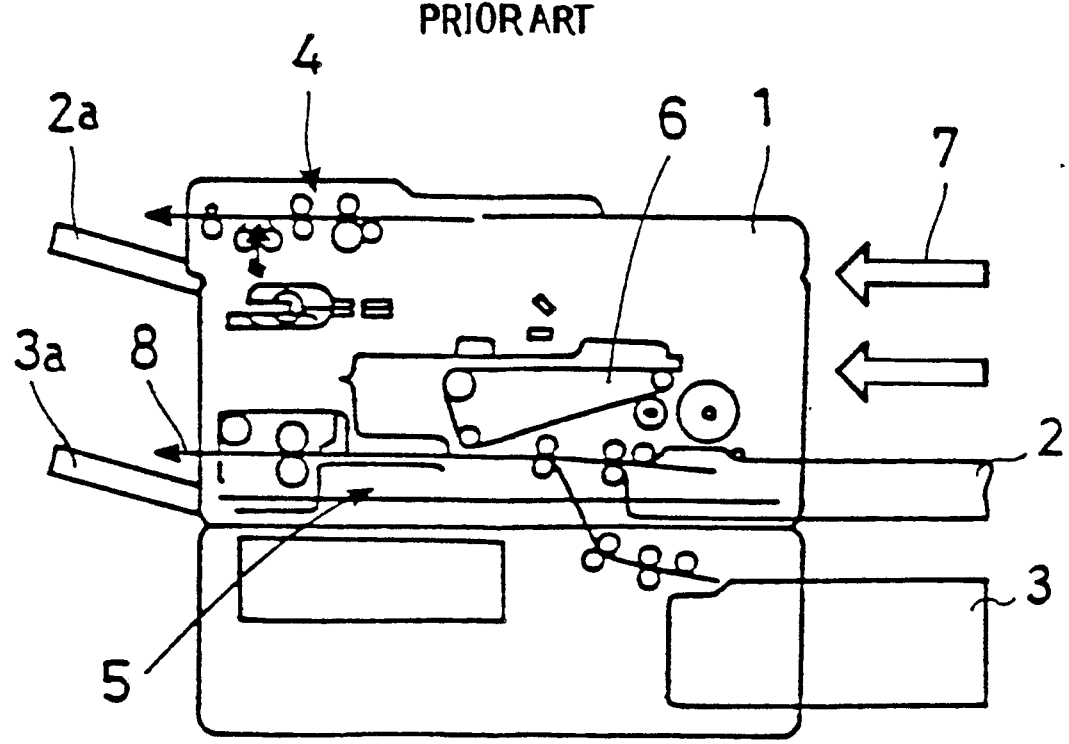
FIG. 2 is a schematic view showing a prior art two-stage type facsimile apparatus.
Figure 4A:
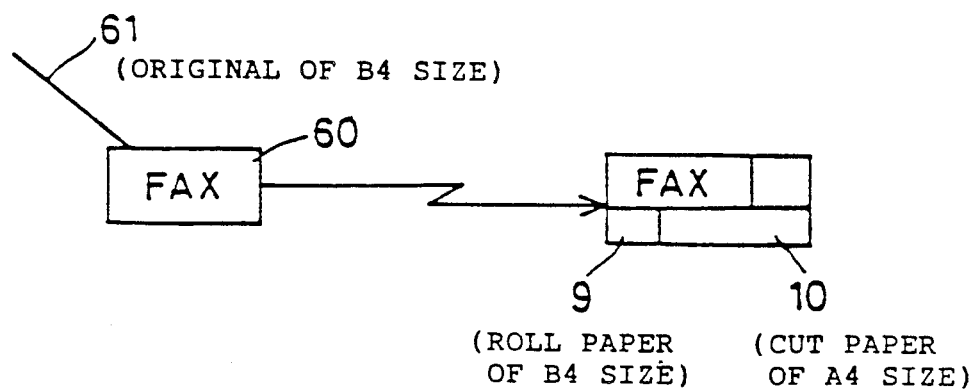
FIGS. 4a and 4b are diagrams showing the interrelations between a B4 size original and a legal size original.
Figure 4B:
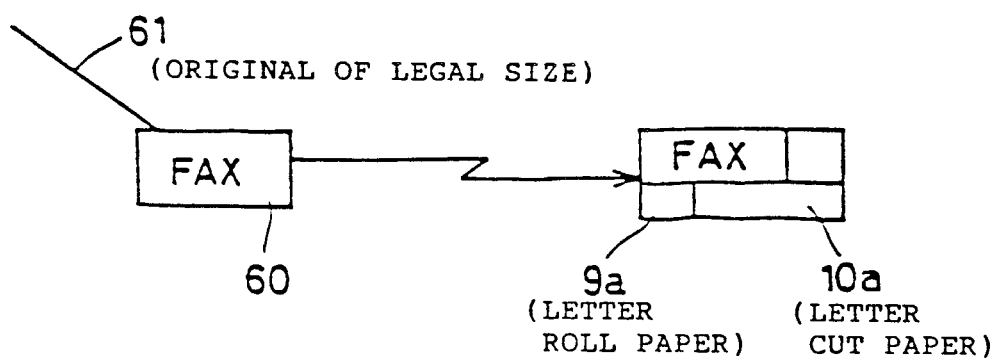

Referring to FIGS. 1, 4 and 5, there is provided a facsimile apparatus having a main body 11 which comprises halved port 11a (upper) and 11b (lower). The main body 11 includes a transmitter section 12 and a receiver section 13. The following embodiments use paper for a sheet.

The transmitter section 12 is situated at a left-hand corner of the main body 11, and comprises a feeding path 18 including a plurality of rollers 16 and 17, the feeding path 18 for feeding an original from a platen 14 to a discharging tray 15, and a reading section 20 for optically reading the original received, a transmitter/receiver-side control section 21 for electrically converting a word signal read at the reading section 20 into an electrical signal and transmitting the signal to a recipient, and an operation panel 22 for sending a signal to operate the control section 21, which is disposed above the roll paper 9. Hereinafter, the receiver/transmitter-side control section 21 will be referred to as the control section.

The receiver section 13 has the same structure as that of an ordinary laser printer. In addition to the control section 21, which converts electrical signals into optical signals, this section 13 has an optical system 28, including a rotary reflector 27, for injecting the optical signals from the control section 21 onto a photosensitive drum 26 through a lens 25, a developing unit 29 for developing an electrostatic latent image on the photosensitive drum 26 into a visible toner image, a charger 30 for charging the photosensitive drum 26, a transfer charger 32 for transferring the toner image onto the paper fed from a supplier section 31, a fixing section 33 for fixing the toner image and the discharging tray 15 for receiving the image-bearing paper. The reference numeral 35 denotes a cleaning device for removing a developer remaining on the photosensitive drum 26, and the reference numeral 36 denotes a feed path leading from the paper supplier section 31.

The paper supplier section 31 will be described in greater detail:

The paper supplier section 31 includes an accommodation chamber 37 for housing a cassette 38 in which a roll paper 9 and cut sheets are stored. The cassette 38 is inserted into the accommodation chamber 37 through an opening 60 in the same manner as a drawer is. The cassette 38 has a recess 46 at one end in which cut sheets are stacked and a pocket 42 at the opposite end in which the roll paper 9 is placed. The reference numeral 45 denotes a raised plate.

The cassette 38 includes feed rollers 44 adjacent to the pocket 42. The feed rollers 44 are driven by power through a gear 43. The roll paper 9 is fed by the feed rollers 44 and cut by a cutter 70 disposed in the feed path 36, the cutter being operable in response to a signal from the control section 21.

There is disposed a pick-up roller 51 above the recess 46, and the cut paper placed in the recess 46 is fed to the feed rollers 44 under the guidance of a curved wall 50.

The control section 21 includes an original width detecting means 51a, an original length detecting means 52a, a roll paper width detecting means 53a, a cut paper size detecting means 54a, a central processing unit (CPU) 55a for judging whether the roll paper 9 or the cut paper should be used in response to a signal from these detecting means 51a to 54a, a driving section 56a for driving the feed rollers 44 and a driving section 57a for operating the cutter 70 both in response to a signal from the CPU 55a, and a driving section 58a for driving the pick-up roller 51.

The original width detecting means 51a detects the width of an original (message) sent from an outside transmitter 60 by a digital discriminating signal in the phase B.

In general the image data is transmitted as line picture units, and is stored in the page memory in line pictures. The original length detecting means 52a counts the memory lines in the page memory and determines the length of an original sent from the transmitter 60.

Figure 3:
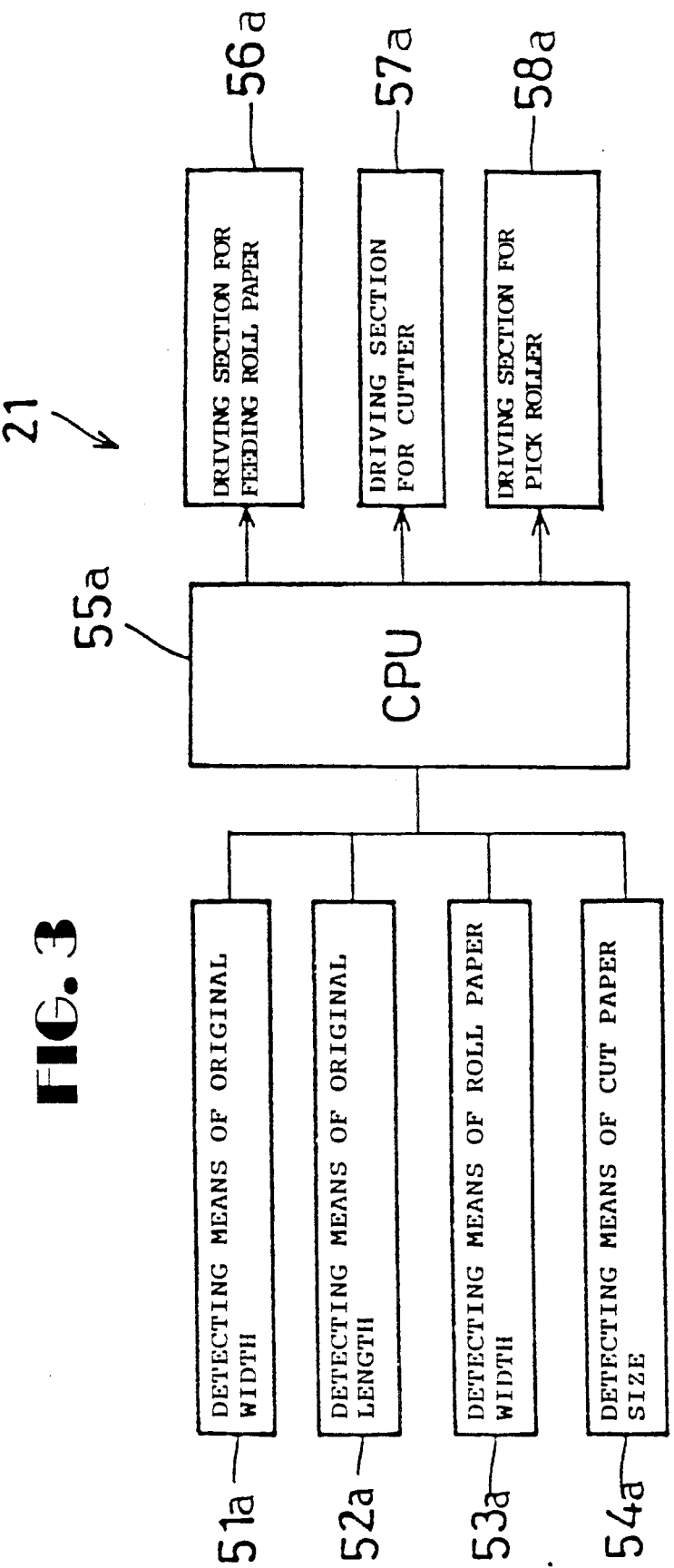
FIG. 3 is a block diagram showing a control section of the sheet feeding device according to the present invention.

Referring to FIG. 3, the roll paper width detecting means 53a and the cut paper size detecting means 54a comprise optical sensors disposed in the recess 46 and the pocket 42.

Examples of the operation of the sheet feeding device will be described:

CASE (1)

In the case (1) as shown in FIG. 4a the received original (message) is B4 size, and the cassette accommodates a B4 roll paper 9 and A4 cut papers 10. The facsimile apparatus recognizes the width of the original by a digital signal issued in accordance with the original width, transmitted subsequently to a call signal from the transmitter. The control section 21 selects the B4 roll paper 9 in response to the signal indicating that the receiving original is B4 size, and drives the feed rollers 44.

The length of the received original (message) is recognized by counting the lines stored in the page memory, in response to which the cutter 70 is driven to cut the roll paper 9 to an appropriate length. If the received original is found A4 size, the A4 cut paper is selected and fed out by the pick-up roller 51. In this way the receiving data is printed on the A4 cut paper 10.

To print the data on the paper, the photosensitive drum 26 is subjected to exposure by the optical system 28 in response to a character signal so that an electrostatic latent image is formed on the photosensitive drum 26, and the latent image is developed into a visible toner image by the developing unit 29. Then the toner image is transferred onto the paper and fixed at the fixing section 33. The printed paper is led to the discharging tray 15.

CASE (2)

This is a case where a legal size (14 inches) original (message) is longitudinally received. Suppose that the cassette 38 accommodates a letter-size roll paper 9a (8.5 inches) and a letter-size cut paper 10a. The message is received on the letter-size roll paper 9a. If the roll paper 9a runs out of stock, the letter-size cut paper 10a replaces for it.

As is evident from the foregoing description, the present invention has many advantages as follows:

The paper sizes are selected between the roll paper and the cut paper in accordance with a received message. In addition, if either roll paper or cut paper runs out of stock, the other automatically replaces for it to receive the message. The roll paper and the stacked cut papers are accommodated in the cassette in a flat posture, thereby contributing to the compact size of the facsimile apparatus. In the illustrated embodiments paper is used as a recording material but the recording medium is not limited to ordinary paper. Instead of ordinary paper, a photo-sensitive sheet or any other pliable sheet can be used.

Referring to FIG. 5, the cassette 38 will be described in detail:

As described above, the cassette 38 is mounted on the facsimile apparatus by being inserted into a housing chamber 62 through the opening 60. The cassette 38 is shaped like a tray having a shallow bottom. The feed rollers 44 are disposed adjacent to the pocket 42 in which the roll paper 9 is accommodated. The raised plate 45 is provided with frictional members 45b and pawls 45a. The curved plate 50 guides cut papers toward the feed rollers 53. When the roll paper and the cut papers run out of stock, the cassette 38 is pulled out of the housing chamber 62, and fresh roll paper and/or cut papers are loaded therein.

The discharging of paper will be more particularly described:

The discharging tray 15 is disposed in a space 37 in an upper portion of the main body 11 of the facsimile apparatus. The tray 15 has two discharge ports 38a and 39 at opposite terminating ends; the discharge port 38a is for discharging a recorded paper and the discharge port 39 is for discharging a transmitted original. More specifically, the discharging tray 15 is disposed on the extension of the main feeding path 18. There is provided a change-over board 40 for determining either a position A at which a transmitting original is received or a position B at which a transmitting original is allowed to pass. The change-over board 40 comprises a base portion 40a and a rotary portion 40c which is pivotally connected to the base portion 40a by means of a pivot 40b. The position A is achieved by rotating the rotary portion 40c and maintaining it horizontal as shown by imaginary lines in FIG. 1. The position B is achieved as shown in FIG. 1 by folding the rotary portion 40c over the base portion 40a.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A facsimile machine capable of receiving electrical facsimile messages produced from differently sized original sheet documents and also being capable of producing a visual reproduction of such received messages on correspondingly sized copy sheets, said facsimile machine comprising:
    a roll-sheet supply of copy medium having a predetermined width and being selectively cut to predetermined lengths during use;
    at least one cut-sheet supply of copy medium having a predetermined length and width;
    means for determining the width of the original sheet document used to generate the received facsimile message based on the content of said received facsimile message;
    means for selectively activating an available one of said supplies of copy medium best accommodating the determined original sheet document width; and
    means for cutting the roll sheet in accordance with the length of the original document when the roll sheet is selected.

2. A facsimile machine as in claim 1 further comprising:
    a removable tray containing both said roll-sheet supply and said cut-sheet supply.

3. A facsimile machine as in claim 1 further comprising:
    means for scanning an original document and generating a transmitted electrical facsimile message;
    a document receiving bin disposed to accommodate received copy documents conveyed thereinto from one end thereof and to accommodate scanned original documents conveyed thereinto from the opposite end thereof.

4. A facsimile machine as in claim 3 further comprising:
    a platform extending along a path used for feeding scanned original documents into said document receiving bin, said platform having a selectively controllable length in the horizontal direction to define either a contracted length which allows the scanned original sent from one end of the document receiving bin to pass along the platform, or an extended length which allows the scanned original sent form said one end of the document receiving bin to be placed on the platform.

5. A facsimile machine capable of receiving electrical facsimile messages produced from differently sized original sheet documents and also being capable of producing a visual reproduction of such received messages on correspondingly sized copy sheets, said facsimile machine comprising:
    a roll-sheet supply of copy medium having a predetermined width and being selectively cut to predetermined lengths during use;
    at least one cut-sheet supply of copy medium having a predetermined length and width;
    means for determining the size of the original sheet document used to generate the received facsimile message based on the content of said received facsimile message;
    means for selectively activating an available one of said supplies of copy medium best accommodating the determined original sheet document size;
    means for scanning an original document and generating a transmitted electrical facsimile message; and
    a document receiving bin disposed to collect received copy documents at one end thereof and to collect scanned original documents at an opposite end thereof.

6. A facsimile machine as in claim 5 further comprising:
    a platform extending along a path used for feeding scanned original documents into said document receiving bin, said platform having a selectively controllable length to define a first length for receiving and holding the scanned original and a second length for allowing the scanned original to pass into said document receiving bin.

* * * * *